United States Patent
Kwon et al.

(10) Patent No.: US 11,492,466 B2
(45) Date of Patent: Nov. 8, 2022

(54) LATEX COMPOSITION FOR DIP MOLDING, A METHOD OF PREPARING THE SAME, AND MOLDED ARTICLE THEREFROM

(71) Applicant: LG Chem, Ltd., Seoul (KR)

(72) Inventors: Won Sang Kwon, Daejeon (KR); Seung Uk Yeu, Daejeon (KR); Seung Whan Oh, Daejeon (KR); Yong Seok Jung, Daejeon (KR); Jung Su Han, Daejeon (KR)

(73) Assignee: LG Chem, Ltd.

( * ) Notice: Subject to any disclaimer, the term of this patent is extended or adjusted under 35 U.S.C. 154(b) by 191 days.

(21) Appl. No.: 16/971,162

(22) PCT Filed: Nov. 1, 2019

(86) PCT No.: PCT/KR2019/014709
§ 371 (c)(1),
(2) Date: Aug. 19, 2020

(87) PCT Pub. No.: WO2020/116793
PCT Pub. Date: Jun. 11, 2020

(65) Prior Publication Data
US 2021/0087371 A1 Mar. 25, 2021

(30) Foreign Application Priority Data
Dec. 7, 2018 (KR) .................. 10-2018-0157210

(51) Int. Cl.
*C08L 13/02* (2006.01)
*C08L 9/04* (2006.01)

(52) U.S. Cl.
CPC .............. *C08L 13/02* (2013.01); *C08L 9/04* (2013.01)

(58) Field of Classification Search
CPC .... C08L 13/02; C08L 9/04; C08F 2/24; C08F 236/12; C08K 5/06
See application file for complete search history.

(56) References Cited

U.S. PATENT DOCUMENTS

| | | | |
|---|---|---|---|
| 4,079,028 A | 3/1978 | Emmons et al. | |
| 5,504,123 A | 4/1996 | Partan, III | |
| 6,027,763 A | 2/2000 | Brown | |
| 6,337,366 B1 | 1/2002 | Amick et al. | |
| 2002/0052441 A1 | 5/2002 | Burdick et al. | |
| 2009/0188019 A1* | 7/2009 | Hassan | A41D 19/0055 2/164 |
| 2010/0152365 A1 | 6/2010 | Han et al. | |
| 2011/0213071 A1 | 9/2011 | Suau et al. | |
| 2012/0149859 A1 | 6/2012 | Yang et al. | |
| 2015/0225553 A1 | 8/2015 | Yang et al. | |
| 2015/0299945 A1 | 10/2015 | Gu et al. | |
| 2018/0105706 A1 | 4/2018 | Korenkiewicz | |
| 2019/0085157 A1* | 3/2019 | Kim | A41D 19/00 |
| 2022/0017728 A1* | 1/2022 | Ha | C08F 236/12 |

FOREIGN PATENT DOCUMENTS

| | | | |
|---|---|---|---|
| CN | 101747542 A | 6/2010 | |
| EP | 1806386 A2 * | 7/2007 | ........... C08F 283/06 |
| JP | H11104561 A | 4/1999 | |
| JP | 2001520297 A | 10/2001 | |
| JP | 2003268050 A | 9/2003 | |
| JP | 2010144163 A | 7/2010 | |
| JP | 2013527258 A | 6/2013 | |
| KR | 100252402 B1 | 4/2000 | |
| KR | 20010014590 A | 2/2001 | |
| KR | 100379588 B1 | 7/2003 | |
| KR | 20100069621 A | 6/2010 | |
| KR | 20100133638 A | 12/2010 | |
| KR | 20120129936 A | 11/2012 | |
| KR | 20150069008 A | 6/2015 | |
| KR | 101577501 B1 | 12/2015 | |

OTHER PUBLICATIONS

International Search Report for Application No. PCT/KR2019/014709 dated Feb. 13, 2020, 3 pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

Provided is a latex composition for dip molding. The latex composition for dip molding includes a carboxylic acid-modified nitrile-based copolymer latex and a hydrophobically modified alkali-soluble emulsion thickener, wherein the hydrophobically modified alkali-soluble emulsion thickener includes a copolymer including an associative portion and a non-associative portion, and the associative portion includes a monomer-derived repeating unit substituted by one or more first hydrophobic groups selected from the group consisting of alkyl, alkenyl, perfluoroalkyl, and carbosilyl having 8 to 15 carbon atoms, and aryl, arylalkyl, arylalkenyl, alicyclic alkyl, and polycyclic alkyl having 6 to 15 carbon atoms. A method of preparing the latex composition for dip molding, and a molded article manufactured therefrom are also provided.

13 Claims, No Drawings

LATEX COMPOSITION FOR DIP MOLDING, A METHOD OF PREPARING THE SAME, AND MOLDED ARTICLE THEREFROM

CROSS-REFERENCE TO RELATED APPLICATIONS

This application is a national phase entry under 35 U.S.C. § 371 of International Application No. PCT/KR2019/014709, filed Nov. 1, 2019, which claims priority to Korean Patent Application No. 10-2018-0157210, filed Dec. 7, 2018, the disclosures of which are incorporated herein by reference.

TECHNICAL FIELD

The present invention relates to a latex composition for dip molding, and more particularly, to the latex composition for dip molding, a method of preparing the same, and a molded article manufactured therefrom.

BACKGROUND ART

As interest in the environment and safety was greatly increased in everyday life, such as house working, including various technical fields such as the food industry, electronics industry, and medical field, a demand for gloves for hand protection was increased, whereby a rubber glove market was also greatly increased.

In an increasingly competitive rubber glove market, a demand for a differentiated product emphasizing specialty is increased, rather than cheap general purpose products, for responding to diversification of a glove use and strengthening environmental regulations.

However, conventional natural rubber gloves have a limited use to a medical purpose, and as it became known that the natural rubber gloves have an allergen such as protein contained in natural rubber, a demand for nitrile rubbers which allow quality implementation in various uses as compared with the natural rubber gloves and do not contain an allergen, has been increased.

Since the nitrile rubbers allow various quality implementation as compared with the natural rubber gloves, the use of the gloves may be classified into a use for thin gloves, an industrial use, an environmentally friendly use, and the like, in addition to soft medical gloves replacing the natural rubber gloves.

However, though a latex for gloves having excellent physical properties such as strength and chemical resistance has been developed for responding to diversification of the glove use, the excellent physical properties and manufacturing workability of the gloves have a trade-off relation, and thus, flow mark properties and syneresis properties are deteriorated so that the productivity of manufacturers is decreased.

Thus, development of a technology for satisfying both the workability during glove manufacture and the physical properties of the gloves manufactured therefrom is demanded.

DISCLOSURE

Technical Problem

An object of the present invention is to improve workability during dip molding using a latex composition for dip molding and to maintain the physical properties of a dip-molded article such as gloves manufactured therefrom to an equivalent or higher level.

An object of the present invention is to provide a latex composition for dip molding in which during the preparation of a carboxylic acid-modified nitrile-based copolymer latex composition, a hydrophobically modified alkali-soluble emulsion thickener is included to improve workability during dip molding and simultaneously to maintain the physical properties such as tensile properties of a dip molded articles such as gloves manufactured therefrom to an equivalent or higher level, a method of preparing the same, and a dip-molded article therefrom.

Technical Solution

In one general aspect, a latex composition for dip molding includes: a carboxylic acid-modified nitrile-based copolymer latex and a hydrophobically modified alkali-soluble emulsion thickener, wherein the hydrophobically modified alkali-soluble emulsion thickener includes a copolymer including the following associative portion and non-associative portion, and the associative portion includes a monomer-derived repeating unit substituted by one or more hydrophobic groups selected from the group consisting of alkyl, alkenyl, perfluoroalkyl, and carbosilyl having 8 to 15 carbon atoms, and aryl, arylalkyl, arylalkenyl, alicyclic alkyl, and polycyclic alkyl having 6 to 15 carbon atoms.

In another general aspect, a method of preparing a latex composition for dip molding includes: preparing a carboxylic acid-modified nitrile-based copolymer latex; and adding a hydrophobically modified alkali-soluble emulsion thickener to the carboxylic acid-modified nitrile-based copolymer latex, wherein the hydrophobically modified alkali-soluble emulsion thickener includes a copolymer including an associative portion and non-associative portion, and the associative portion includes a monomer-derived repeating unit substituted by one or more hydrophobic groups selected from the group consisting of alkyl, alkenyl, perfluoroalkyl, and carbosilyl having 8 to carbon atoms, and aryl, arylalkyl, arylalkenyl, alicyclic alkyl, and polycyclic alkyl having 6 to 15 carbon atoms.

In still another general aspect, a molded article includes a layer derived from a latex composition for dip molding.

Advantageous Effects

A dip-molded article such as gloves manufactured using the latex composition for dip molding according to the present invention has effects of having excellent workability and maintaining the physical properties such as tensile properties to an equivalent or higher level.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

Hereinafter, the present invention will be described in more detail for understanding the present invention.

The term, "a monomer-derived repeating unit" in the present invention may refer to a component, a structure, or a material itself derived from a monomer, and as a specific example, may refer to a repeating unit formed in the polymer by the added monomer participating in the polymerization reaction during polymerization.

The term, "latex" in the present invention may refer to a polymer polymerized by polymerization or a copolymer being present in a form dispersed in water, and as a specific example, may refer to fine particles of a polymer in a rubber phase or a copolymer in a rubber phase polymerized by emulsion polymerization being present in a form dispersed in water in a colloid state.

The term, "hydrophobically modified alkali-soluble emulsion thickener" in the present invention may refer to a water-soluble or water-dispersible polymer compound having a hydrophobic group, and as a specific example, may refer to an hydrophobically modified alkali-soluble thickener composition in which a specific hydrophobic portion interacts with itself or another hydrophobic material in an aqueous system to show a thickening effect.

The term, "derived layer" in the present invention may represent a layer formed from a polymer or a copolymer, and as a specific example, a layer formed from a polymer or a copolymer in which the polymer or the copolymer is attached, fixed, and/or polymerized on a dip mold during the manufacture of a dip-molded article.

The latex composition for dip molding according to the present invention may include a carboxylic acid-modified nitrile-based copolymer latex and a hydrophobically modified alkali-soluble emulsion thickener. Since the carboxylic acid-modified nitrile-based copolymer latex is hydrophobically bonded to the hydrophobically modified alkali-soluble emulsion thickener, when dip molding is performed using the latex composition for dip molding, workability is excellent and the physical properties such as tensile properties of a dip-molded article are excellent.

As a thickener generally used for a thickening effect of the latex composition for dip molding, a non-associative thickener and an associative thickener may be used. An alkali-soluble thickener (ASE) which is the non-associative thickener swells according to an increased pH in the latex composition for dip molding, so that a distance between the swelled non-associative thickener and a polymer latex is narrowed to thicken the latex composition for dip molding. In addition, the associative thickener has a hydrophobic group at both ends of the main chain, and forms a hydrophobic bond with hydrophobic carboxylic acid-modified nitrile-based copolymer latex particles being dispersed in an aqueous phase in the latex composition for dip molding to thicken the latex composition for dip molding.

Meanwhile, since a generally used non-associative thickener shows a thickening phenomenon by swelling, it has an advantage that a high-viscosity solution is prepared, but has a disadvantage that the thickener is greatly influenced by a total solid content (TSC), pH, and temperature of a polymer latex solution to be thickened, and external pressure such as shear, and the like. Besides, since a generally used associative thickener includes a hydrophobic group at both ends of a main chain, it has an advantage that the thickener is less influenced by the total solid content (TSC), pH, temperature, and the like, and a decrease in viscosity is small even under the condition in which an external pressure such as shear is high, but has a disadvantage that it is difficult to prepare a high-viscosity solution.

However, the hydrophobically modified alkali-soluble emulsion thickener according to the present invention is a hybrid type thickener including both thickening mechanisms of the non-associative thickener and the associative thickener, and may include a copolymer including an associative portion and a non-associative portion.

That is, the hydrophobically modified alkali-soluble emulsion thickener according to the present invention includes a chemical structure similar to that of an alkali-soluble thickener (ASE), so that swelling may occur according to a pH increase. In addition, the hydrophobically modified alkali-soluble emulsion thickener according to the present invention has a chemical structure similar to that of the associative thickener including a hydrophobic group at both ends of a main chain from an associative portion, and a hydrophobic end and particles in the carboxylic acid-modified nitrile-based copolymer latex are hydrophobically bonded, so that associative thickening may occur together with non-associative thickening due to the swelling.

Accordingly, the hydrophobically modified alkali-soluble emulsion thickener according to the present invention is less influenced by the total solid content (TSC), pH, temperature, external pressure, and the like, allows preparation of a high-viscosity, and for example, when a dip-molded article is manufactured, a dip-molded article having a higher density is formed due to a hydrophobic bond with the particles in the carboxylic acid-modified nitrile-based copolymer latex, thereby improving workability.

According to an exemplary embodiment of the present invention, the hydrophobically modified alkali-soluble emulsion thickener may include a copolymer including an associative portion and a non-associative portion.

According to an exemplary embodiment of the present invention, the associative portion may include a monomer-derived repeating unit substituted by one or more first hydrophobic groups selected from the group consisting of alkyl, alkenyl, perfluoroalkyl, and carbosilyl having 8 to 15 carbon atoms, 10 to 15 carbon atoms, or 12 to 14 carbon atoms, and aryl, arylalkyl, arylalkenyl, alicyclic alkyl, and polycyclic alkyl having 6 to 15 carbon atoms, 8 to 15 carbon atoms, or 10 to 15 carbon atoms.

In the associative portion, a hydrophobic bond easily occurs depending on a range of the number of carbons of the first hydrophobic group and the kind of substituents, and latex stability may be improved.

Meanwhile, the first hydrophobic group may be substituted on a monomer for forming the associative portion by alkoxylate of 1 to 100, 10 to 80, or 15 to 70 of the repeating units. The alkoxylate may be ethoxylate or propoxylate, and specifically for example, ethoxylate. According to an exemplary embodiment of the present invention, the associative portion may further include a monomer-derived repeating unit substituted by one or more second hydrophobic groups selected from the group consisting of alkyl, alkenyl, perfluoroalkyl, and carbosilyl having 16 to 30 carbon atoms, 16 to 20 carbon atoms, or 16 to 18 carbon atoms, and aryl, arylalkyl, arylalkenyl, alicyclic alkyl, and polycyclic alkyl having 16 to 30 carbon atoms, 16 to 25 carbon atoms, or 16 to 20 carbon atoms.

Meanwhile, the second hydrophobic group may be substituted on a monomer for forming the associative portion by alkoxylate of 1 to 100, 10 to 80, or 15 to 70 of the repeating units. The alkoxylate may be ethoxylate or propoxylate, and specifically for example, ethoxylate.

When the associative portion further includes the monomer-derived repeating unit substituted by a second hydrophobic group, the associative portion may have a weight ratio of the monomer-derived repeating unit substituted by a first hydrophobic group to the monomer-derived repeating unit substituted by a second hydrophobic group of 1:1 to 10, 1:1 to 5, or 1:2 to 4, and within the range, the associative portion is hydrophobically bonded to the hydrophobic material of the carboxylic acid-modified nitrile-based copolymer latex in the latex composition for dip molding including the hydrophobically-modified alkali-soluble emulsion thickener to interact with each other, whereby a thickening effect is excellent, a syneresis time is greatly improved, and thus, the flow mark properties of the dip-molded article are excellent.

According to an exemplary embodiment of the present invention, the monomer-derived repeating unit substituted by a first hydrophobic group or a second hydrophobic group may be one or more selected from the group consisting of an ethylenic unsaturated monomer-derived repeating unit, an ethylenic unsaturated acid monomer-derived repeating unit, and an alkyl (meth)acrylate monomer-derived repeating unit.

An ethylenic unsaturated monomer forming the ethylenic unsaturated acid monomer-derived repeating unit may be one or more selected from the group consisting of olefin-based monomer, conjugated diene-based monomer, vinyl aromatic monomer, and derivatives thereof. The olefin-based monomer may be one or more selected from the group consisting of ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene.

The conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo refers to a halogen atom).

The vinyl aromatic monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

An ethylenic unsaturated acid monomer forming the ethylenic unsaturated acid monomer-derived repeating unit may be an ethylenic unsaturated monomer containing an acid group such as a carboxyl group, a sulfonic acid group, and an acid anhydride group, specific examples thereof may be one or more selected from the group consisting of ethylenic unsaturated acid monomers such as acrylic acid, methacrylic acid, itaconic acid, maleic acid, and fumaric acid; polycarboxylic acid anhydrides such as anhydrous maleic acid and anhydrous citraconic acid; ethylenic unsaturated sulfonic acid monomers such as styrene sulfonic acid; and ethylenic unsaturated polycarboxylic acid partial ester monomers such as monobutyl fumarate, monobutyl maleate, and mono-2-hydroxypropyl maleate, more specific examples thereof may be one or more selected from the group consisting of acrylic acid, methacrylic acid, itaconic acid, maleic acid, and fumaric acid, and still more specific examples may be acrylic acid or methacrylic acid. The ethylenic unsaturated acid monomer may be used in the form of a salt such as an alkali metal salt or an ammonium salt during polymerization.

An alkyl (meth)acrylate monomer forming the alkyl (meth)acrylate monomer-derived repeating unit may refer to include both a linear alkyl group having 1 to 10 carbon atoms and a branched alkyl group having 3 to 8 carbon atoms. As a specific example, the alkyl (meth)acrylate monomer may be one or more selected from the group consisting of methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and ethyl hexyl acrylate.

According to an exemplary embodiment of the present invention, the associative portion may be included at 10 wt % to 25 wt %, 12 wt % to 25 wt %, or 15 wt % to 20 wt %, based on the total content of the hydrophobically modified alkali-soluble emulsion thickener, and within the range, the associative portion is bonded to the hydrophobic material of the carboxylic acid-modified nitrile-based copolymer latex in the latex composition for dip molding including the hydrophobically modified alkali-soluble emulsion thickener and interacts with each other, whereby a thickening effect is excellent, a syneresis time improvement is big, and thus, the flow mark properties of a dip-molded article are excellent.

According to an exemplary embodiment of the present invention, the non-associative portion may include an ethylenic unsaturated acid monomer-derived repeating unit and an alkyl (meth)acrylate monomer-derived repeating unit.

According to an exemplary embodiment of the present invention, the ethylenic unsaturated acid monomer forming the ethylenic unsaturated acid monomer-derived repeating unit included in the non-associative portion may be an ethylenic unsaturated monomer containing an acid group such as a carboxyl group, a sulfonic acid group, and an acid anhydride group, specific examples thereof may be one or more selected from the group consisting of ethylenic unsaturated acid monomers such as acrylic acid, methacrylic acid, itaconic acid, maleic acid, and fumaric acid; polycarboxylic acid anhydrides such as anhydrous maleic acid and anhydrous citraconic acid; ethylenic unsaturated sulfonic acid monomers such as styrene sulfonic acid; and ethylenic unsaturated polycarboxylic acid partial ester monomers such as monobutyl fumarate, monobutyl maleate, and mono-2-hydroxypropyl maleate, more specific examples thereof may be one or more selected from the group consisting of acrylic acid, methacrylic acid, itaconic acid, maleic acid, and fumaric acid, and still more specific examples may be acrylic acid or methacrylic acid. The ethylenic unsaturated acid monomer may be used in the form of a salt such as an alkali metal salt or an ammonium salt during polymerization.

When the non-associative portion includes the ethylenic unsaturated acid monomer-derived repeating unit, the content of the ethylenic unsaturated acid monomer-derived repeating unit may be 30 wt % to 60 wt %, 33 wt % to 53 wt %, or 35 wt % to 45 wt %, based on the total content of the hydrophobically modified alkali-soluble emulsion thickener, and within the range, an increase in viscosity of the hydrophobically modified alkali-soluble emulsion thickener due to an increased pH may be adjusted together with the alkyl (meth)acrylate monomer-derived repeating unit, and thus, the latex composition for dip molding including the hydrophobically modified alkali-soluble emulsion thickener may maintain the viscosity to improve syneresis when a dip-molded article is molded.

According to an exemplary embodiment of the present invention, the alkyl (meth)acrylate monomer forming the alkyl (meth)acrylate monomer-derived repeating unit included in the non-associative portion may refer to include both a linear alkyl group having 1 to 10 carbon atoms and a branched alkyl group having 3 to 8 carbon atoms. As a specific example, the alkyl (meth)acrylate monomer may be one or more selected from the group consisting of methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and ethyl hexyl acrylate.

When the non-associative portion includes the alkyl (meth)acrylate monomer-derived repeating unit, the content of the alkyl (meth)acrylate monomer-derived repeating unit may be 30 wt % to 60 wt %, 35 wt % to 55 wt %, or 40 wt % to 50 wt %, based on the total content of the hydrophobically modified alkali-soluble emulsion thickener (based on solid content), and within the range, an increase in viscosity of the hydrophobically modified alkali-soluble emulsion thickener due to an increased pH may be adjusted together with the ethylenic unsaturated acid monomer-derived repeating unit, and thus, the latex composition for dip molding including the hydrophobically modified alkali-soluble emulsion thickener may maintain the viscosity to improve syneresis when a dip-molded article is molded.

Meanwhile, the hydrophobically modified alkali-soluble emulsion thickener according to the present invention including the associative portion and the non-associative portion may be a copolymer represented by the following Chemical Formula 1:

$$Q_1\text{-}[A]_x\text{-}[B]_y\text{-}[C]_z\text{-}Q_2 \quad \text{[Chemical Formula 1]}$$

wherein A is an ethylenic unsaturated acid monomer-derived repeating unit, B is an alkyl (meth)acrylate monomer-derived repeating unit, C is a monomer-derived repeating unit substituted by a first hydrophobic group or a monomer-derived repeating unit substituted by a first hydrophobic group and a monomer-derived repeating unit substituted by a second hydrophobic group, $Q_1$ and $Q_2$ are independently of each other hydrogen or a monovalent hydrocarbon group having 1 to 30 carbon atoms, and x, y, and z represent weight fractions of A, B, and C in the hydrophobically modified alkali-soluble emulsion thickener and x+y+z=1.

According to an exemplary embodiment of the present invention, the ethylenic unsaturated acid monomer-derived repeating unit represented by A may be the ethylenic unsaturated acid monomer-derived repeating unit described above, the alkyl (meth)acrylate monomer-derived repeating unit represented by B may be the alkyl (meth)acrylate monomer-derived repeating unit described above, and the monomer-derived repeating unit substituted by a hydrophobic group represented by C may be the monomer-derived repeating unit substituted by a first hydrophobic group described above or the monomer-derived repeating unit substituted by a first hydrophobic group and the monomer-derived repeating unit substituted by a second hydrophobic group. In addition, x, y, and z independently of one another may have the same contents as those of the monomer-derived repeating unit represented by A, B, and C described above.

According to an exemplary embodiment of the present invention, in Chemical Formula 1, the repeating units represented by A, B, and C are sequentially indicated for convenience of description, but the hydrophobically modified alkali-soluble emulsion thickener represented by Chemical Formula 1 may be a random copolymer in which A, B, and C are randomly arranged, or a block copolymer in which A, B, and C form blocks, respectively.

In addition, according to an exemplary embodiment of the present invention, the monomer-derived repeating unit substituted by a hydrophobic group represented by C may be present on one side end or both side ends of the polymer represented by Chemical Formula 1.

In addition, according to an exemplary embodiment of the present invention, the hydrophobically modified alkali-soluble emulsion thickener may have a weight average molecular weight of 2,000 g/mol to 1,000,000 g/mol, 5,000 g/mol to 500,000 g/mol, or 8,000 g/mol to 300,000 g/mol, and within the range, the hydrophobically modified alkali-soluble emulsion thickener may be added to the carboxylic acid-modified nitrile-based copolymer latex without reduced stability, and when a dip-molded article is molded with the latex composition for dip molding prepared therefrom, a syneresis time is greatly improved and the flow mark properties of the dip-molded article are excellent.

In addition, according to an exemplary embodiment of the present invention, the hydrophobically modified alkali-soluble emulsion thickener may have generally a viscosity at 25° C. of 120 cPs or less (Brookfield viscosity, #4 spindle 60 rpm) and a pH of 2.5 to 4.5 in the state of an aqueous solution having a solid content (concentration) of 30%, and within the range, the hydrophobically modified alkali-soluble emulsion thickener is not aggregated so that it may be added to the carboxylic acid-modified nitrile-based copolymer without reduced stability, a syneresis time is greatly improved, and thus, the flow mark properties of the dip-molded article are excellent.

Meanwhile, the latex composition for dip molding according to the present invention includes the carboxylic acid-modified nitrile-based copolymer latex and the hydrophobically modified alkali-soluble emulsion thickener, the content of the hydrophobically modified alkali-soluble emulsion thickener may be 0.01 parts by weight to 10 parts by weight, 0.03 parts by weight to 8 parts by weight, or 0.05 parts by weight to 5 parts by weight (based on solid content), based on 100 parts by weight (based on solid content) of the carboxylic acid-modified nitrile-based copolymer latex, and within the range, a syneresis time is greatly improved and the flow mark properties of the dip-molded article are excellent.

According to an exemplary embodiment of the present invention, the carboxylic acid-modified nitrile-based copolymer in the carboxylic acid-modified nitrile-based copolymer latex may include a conjugated diene-based monomer-derived repeating unit, an ethylenic unsaturated nitrile-based monomer-derived repeating unit, and an ethylenic unsaturated acid monomer-derived repeating unit.

According to an exemplary embodiment of the present invention, the conjugated diene-based monomer forming the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene, as a specific example, may be 1,3-butadiene or isoprene, and as a more specific example, may be 1,3-butadiene.

The content of the conjugated diene-based monomer-derived repeating unit may be 40 wt % to 89 wt %, 45 wt % to 80 wt %, or 50 wt % to 78 wt %, based on the total content of the carboxylic acid-modified nitrile-based copolymer, and within the range, the dip-molded article molded from the latex composition for dip molding including the carboxylic acid-modified nitrile-based copolymer is flexible, has an excellent wearing sensation, and also has excellent oil resistance and tensile strength at the same time.

In addition, according to an exemplary embodiment of the present invention, the ethylenic unsaturated nitrile-based monomer forming the ethylenic unsaturated nitrile-based monomer-derived repeating unit may be one or more selected from the group consisting of acrylonitrile, methacrylonitrile, fumaronitrile, α-chloronitrile, and α-cyanoethylacrylonitrile, as a specific example, may be acrylonitrile and methacrylonitrile, and a more specific example, may be acrylonitrile.

The content of the ethylenic unsaturated nitrile-based monomer-derived repeating unit may be 10 wt % to 50 wt %, 15 wt % to 45 wt %, or 20 wt % to 40 wt %, based on the total content of the carboxylic acid-modified nitrile-based copolymer, and within the range, the dip-molded article molded from the latex composition for dip molding including the carboxylic acid-modified nitrile-based copolymer is flexible, has an excellent wearing sensation, and excellent oil resistance and tensile strength at the same time.

In addition, according to an exemplary embodiment of the present invention, the ethylenic unsaturated acid monomer forming the ethylenic unsaturated acid monomer-derived repeating unit may be an ethylenic unsaturated monomer containing an acid group such as a carboxyl group, a sulfonic acid group, and an acid anhydride group, specific examples thereof may be one or more selected from the group consisting of ethylenic unsaturated acid monomers such as acrylic acid, methacrylic acid, itaconic acid, maleic acid, and fumaric acid; polycarboxylic acid anhydrides such as anhydrous maleic acid and anhydrous citraconic acid; ethylenic unsaturated sulfonic acid monomers such as styrene sulfonic acid; and ethylenic unsaturated polycarboxylic acid partial ester monomers such as monobutyl fumarate, monobutyl maleate, and mono-2-hydroxypropyl maleate, more specific examples thereof may be one or more selected from the group consisting of acrylic acid, methacrylic acid, itaconic acid, maleic acid, and fumaric acid, and still more specific examples may be acrylic acid or methacrylic acid. The ethylenic unsaturated acid monomer may be used in the form of a salt such as an alkali metal salt or an ammonium salt during polymerization.

The content of the ethylenic unsaturated acid monomer-derived repeating unit may be 0.1 wt % to 10 wt %, 0.5 wt % to 9 wt %, or 1 wt % to 8 wt %, based on the total content of the carboxylic acid-modified nitrile-based copolymer, and within the range, the dip-molded article molded from the latex composition for dip molding including the carboxylic acid-modified nitrile-based copolymer is flexible, has an excellent wearing sensation, and has excellent tensile strength at the same time.

According to an exemplary embodiment of the present invention, the carboxylic acid-modified nitrile-based copolymer in the carboxylic acid-modified nitrile-based copolymer latex may selectively further include an ethylenic unsaturated monomer-derived repeating unit, in addition to a conjugated diene-based monomer-derived repeating unit, an ethylenic unsaturated nitrile-based monomer-derived repeating unit, and an ethylenic unsaturated acid monomer-derived repeating unit.

The ethylenic unsaturated monomer forming the ethylenic unsaturated monomer-derived repeating unit may be one or more selected from the group consisting of hydroxyalkyl (meth)acrylate monomers having 1 to 4 carbon atoms; vinyl aromatic monomers selected from the group consisting of styrene, alkylstyrene, and vinyl naphthalene; fluoroalkylvinyl ether such as fluoroethylvinyl ether; ethylenic unsaturated amide monomers selected from the group consisting of (meth)acrylamide, N-methylol (meth)acrylamide, N,N-dimethylol (meth)acrylamide, N-methoxymethyl (meth)acrylamide, and N-propoxy (meth)acrylamide; nonconjugated diene monomers such as vinyl pyridine, vinyl norbornene, dicyclopentadiene, 1,4-hexadiene; ethylenic unsaturated carbonate ester monomers selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate, as a more specific example, may be one or more selected from the group consisting of hydroxyalkyl (meth)acrylate monomers having 1 to 4 carbon atoms, and as a still more specific example, may be a hydroxyethyl (meth)acrylate monomer.

The content of the ethylenic unsaturated monomer-derived repeating unit may be less than 20 wt %, 0.2 wt % to 10 wt %, or 0.5 wt % to 5 wt %, based on the total content of the carboxylic acid-modified nitrile-based copolymer, and within the range, the dip-molded article molded from the latex composition for dip molding including the carboxylic acid-modified nitrile-based copolymer is flexible, has an excellent wearing sensation, and has excellent tensile strength at the same time.

According to an exemplary embodiment of the present invention, the carboxylic acid-modified nitrile-based copolymer may have a glass transition temperature of −55° C. to −15° C., −50° C. to −15° C., or −50° C. to −20° C., and within the range, deterioration of tensile properties such as tensile strength and crack occurrence of the dip-molded article molded from the latex composition for dip molding including the carboxylic acid-modified nitrile-based copolymer are prevented, while the dip-molded article has less sticky, thereby having an excellent wearing sensation. The glass transition temperature may be measured using a differential scanning calorimetry.

In addition, according to an exemplary embodiment of the present invention, the carboxylic acid-modified nitrile-based copolymer particles in the carboxylic acid-modified nitrile-based copolymer latex may have an average particle diameter of 90 nm to 200 nm, 95 nm to 195 nm, or 100 nm to 190 nm, and within the range, the viscosity of the carboxylic acid-modified nitrile-based copolymer latex is not increased, so that the carboxylic acid-modified nitrile-based copolymer latex may be prepared with a high concentration, and the tensile properties such as tensile strength of the dip-molded article molded from the latex composition for dip molding including the same are excellent. The average particle diameter may be measured using a laser scattering analyzer (Nicomp).

In addition, according to an exemplary embodiment of the present invention, the latex composition for dip molding may further include an additive such as a vulcanizer, an ionic crosslinker, a pigment, a vulcanization catalyst, a filler, and a pH adjusting agent, if necessary.

In addition, according to an exemplary embodiment of the present invention, the latex composition for dip molding may have, as an example, a solid content (concentration) of 8 wt % to 40 wt %, 8 wt % to 35 wt %, or 10 wt % to 35 wt %, and within the range, latex transportation efficiency is excellent and an increase in latex viscosity is prevented, so that storage stability is excellent.

As another example, the latex composition for dip molding may have a pH of 8 to 12, 9 to 11, or 9.0 to 11.5, and within the range, processability and productivity during the manufacture of the dip-molded article are excellent. The pH of the latex composition for dip molding may be adjusted by adding the pH adjusting agent described above. The pH adjusting agent may be, as an example, an aqueous potassium hydroxide solution having a concentration of 1 wt % to 5 wt %, or ammonia water having a concentration of 1 wt % to 10 wt %.

Meanwhile, a method of preparing the latex composition for dip molding according to the present invention may include preparing a carboxylic acid-modified nitrile-based copolymer latex including a carboxylic acid-modified nitrile-based copolymer, and adding a hydrophobically modified alkali-soluble emulsion thickener to the prepared carboxylic acid-modified nitrile-based copolymer latex.

That is, the method of preparing a latex composition for dip molding according to the present invention includes: polymerizing a monomer mixture including a conjugated diene-based monomer, an ethylenic unsaturated nitrile-based monomer, and an ethylenic unsaturated acid monomer to prepare a carboxylic acid-modified nitrile-based copolymer latex including a carboxylic acid-modified nitrile-based copolymer; and adding a hydrophobically modified alkali-soluble emulsion thickener to the carboxylic acid-modified nitrile-based copolymer latex, wherein the hydrophobically modified alkali-soluble emulsion thickener includes a copolymer including an associative portion and non-associative portion, and the associative portion includes a monomer-derived repeating unit substituted by one or more hydrophobic groups selected from the group consisting of alkyl, alkenyl, perfluoroalkyl, and carbosilyl having 8 to 15 carbon atoms, and aryl, arylalkyl, arylalkenyl, alicyclic alkyl, and polycyclic alkyl having 6 to 15 carbon atoms.

According to an exemplary embodiment of the present invention, the polymerization of the carboxylic acid-modified nitrile-based copolymer may be performed by emulsion polymerization. The polymerization may be performed by the polymerization of the monomer mixture, and each monomer included in the monomer mixture may be added as the kind of the monomer at the content described above, batchwise or continuously.

Meanwhile, during the polymerization, the monomer mixture may be added, for example, the monomer mixture is added to a polymerization reactor at the same time before the polymerization, or a part of the monomer mixture is primarily added to the polymerization reactor and the remaining monomer mixture is added after initiation of polymerization. As described above, in the case that the monomer mixture is added in portions, when the monomer-derived repeating unit derived from each monomer in the carboxylic acid-modified nitrile-based copolymer is formed, a monomer distribution by a reaction rate difference for each monomer may be uniformized, and thus, a balance between the physical properties of the dip-molded article manufactured using the carboxylic acid-modified nitrile-based copolymer may be improved.

In addition, according to an exemplary embodiment of the present invention, polymerization of the carboxylic acid-modified nitrile-based copolymer may be performed in the presence of an emulsifying agent, a polymerization initiator, an activator, a molecular weight adjusting agent, and the like.

When the polymerization of the carboxylic acid-modified nitrile-based copolymer is performed including the emulsifying agent, the emulsifying agent may be, as an example, one or more selected from the group consisting of anionic surfactants, nonionic surfactants, cationic surfactants, and positive surfactants, and as a specific example, may be one or more anionic surfactants selected from the group consisting of alkylbenzenesulfonate salts, aliphatic sulfonate salts, higher alcohol sulfate salts, α-olefin sulfonate salts, and alkylether sulfate ester salts. In addition, the emulsifying agent may be added at 0.3 parts by weight to 10 parts by weight, 0.8 parts by weight to 8 parts by weight, or 1.5 parts by weight to 6 parts by weight, based on the total content of 100 parts by weight of the monomer mixture, and within the range, polymerization stability is excellent and a foam generation amount is small, and thus, it is easy to manufacture the molded article.

In addition, when the polymerization of the carboxylic acid-modified nitrile-based copolymer is performed including a polymerization initiator, the polymerization initiator may be as an example, a radical initiator, as a specific example, may be one or more selected from the group consisting of inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutylate; and nitrogen compounds such as azobisisobtyronitrile, azobis-2,4-dimethylvaleronitrile, azobiscyclohexanecarbonitrile, and methyl azobisisobutyrate, as a specific example, may be an inorganic peroxide, and as a more specific example, may be a persulfate salt. In addition, the polymerization initiator may be added at 0.01 parts by weight to 2 parts by weight, 0.01 parts by weight to 1.5 parts by weight, or 0.02 parts by weight to 1.5 parts by weight, based on the total content of 100 parts by weight of the monomer mixture, and within the range, a polymerization rate may be maintained at an appropriate level.

In addition, when polymerization of the carboxylic acid-modified nitrile-based copolymer is performed including an activator, the activator may be one or more selected from the group consisting of sodium formaldehyde sulfoxylate, sodium ethylenediamine tetraacetate, ferrous sulfate, dextrose, sodium pyrophosphate, and sodium sulfite. In addition, the activator may be added at 0.01 parts by weight to 5 parts by weight, 0.05 parts by weight to 3 parts by weight, or 0.1 parts by weight to 1 part by weight, based on the total content of 100 parts by weight of the monomer mixture, and within the range, a polymerization rate may be maintained at an appropriate level.

In addition, when the polymerization of the carboxylic acid-modified nitrile-based copolymer is performed including a molecular weight adjusting agent, the molecular weight adjusting agent may be as an example, one or two or more selected from the group consisting of α-methylstyrene dimers; mercaptans such as t-dodecylmercaptan, n-dodecylmercaptan, and octylmercaptan; halogenated hydrocarbons such as carbon tetrachloride, methylene chloride, and methylene bromide; sulfur-containing compounds such as tetrethylthiuram disulfide, dipentamethylenethiuram disulfide, and diisopropylxanthogen disulfide, as a specific example, may be mercaptans, and as a more specific example, may be t-dodecylmercaptan. In addition, the molecular weight adjusting agent may be added at 0.1 parts by weight to 2 parts by weight, 0.2 parts by weight to 1.5 parts by weight, or 0.3 parts by weight to 1.0 parts by weight, based on the total content of 100 parts by weight of the monomer mixture, and within the range, polymerization stability is excellent and when a molded article is manufactured after the polymerization, the molded article has excellent physical properties.

In addition, according to an exemplary embodiment of the present invention, the polymerization of the carboxylic acid-modified nitrile-based copolymer may be performed in water, as a specific example, deionized water as a medium, and for securing polymerization ease, the polymerization may be performed, further including an additive such as a chelating agent, a dispersing agent, a pH adjusting agent, a deoxidation agent, a particle diameter adjusting agent, an anti-aging agent, and an oxygen scavenger.

According to an exemplary embodiment of the present invention, the emulsifying agent, the polymerization initiator, the molecular weight adjusting agent, the additive, and the like may be added batchwise or in portions to the polymerization reactor, and may be added continuously for each addition.

In addition, according to an exemplary embodiment of the present invention, the polymerization of the carboxylic acid-modified nitrile-based copolymer may be performed at a polymerization temperature of 10° C. to 90° C., 20° C. to 80° C., or 25° C. to 75° C., and within the range, latex stability is excellent.

Meanwhile, according to an exemplary embodiment of the present invention, the method of preparing a carboxylic acid-modified nitrile-based copolymer latex may include completing the polymerization reaction to obtain the carboxylic acid-modified nitrile-based copolymer latex. The completion of the polymerization reaction of the carboxylic acid-modified nitrile-based copolymer may be performed at a point of a polymerization conversion rate of 90% or more, 91% or more, or 93% or more, and performed by adding a polymerization terminator, a pH adjusting agent, and an antioxidant. In addition, the method of preparing a carboxylic acid-modified nitrile-based copolymer latex may further include removing unreacted monomers by a deodorization and concentration process, after completing the reaction.

In addition, according to an exemplary embodiment of the present invention, the step of adding the hydrophobically modified alkali-soluble emulsion thickener to the prepared carboxylic acid-modified nitrile-based copolymer latex may be for a step for preparing a latex composition for dip molding. Here, the kind and content of the hydrophobically modified alkali-soluble emulsion thickener may be as described above.

According to the present invention, a molded article including a layer derived from the latex composition for dip molding is provided. The molded article may be a dip-molded article manufactured by dip molding of the latex composition for dip molding or a molded article including a layer derived from the latex composition for dip molding formed from the latex composition for dip molding by dip molding. A method of manufacturing a molded article for molding the molded article may include immersion in the latex composition for dip molding directly by a dipping method, an anode coagulation dipping method, a Teague coagulation dipping method, or the like, and as a specific example, may be performed by the anode coagulation dipping method, and in this case, a dip-molded article having a uniform thickness may be obtained.

As a specific example, the method of manufacturing a molded article may include adhering a coagulant to a dip mold (S100); immersing the dip mold to which the coagulant is adhered in the latex composition for dip molding to form a layer derived from the latex composition for dip molding, that is, a dip-molded layer (S200); and heating the dip-molded layer to crosslink the latex composition for dip molding (S300).

The step (S100) is a step of soaking the dip mold in a coagulant solution for forming the coagulant in the dip mold to adhere the coagulant to the surface of the dip mold, and the coagulant solution is a solution in which a coagulant is dissolved in water, alcohol, or a mixture thereof and the content of the coagulant in the coagulant solution may be 5 wt % to 50 wt %, 7 wt % to 45 wt %, or 10 wt % to 40 wt %, based on the total content of the coagulant solution. The coagulant may be, as an example, one or more selected from the group consisting of metal halides such as barium chloride, calcium chloride, magnesium chloride, zinc chloride, and aluminum chloride; nitrate salts such as barium nitrate, calcium nitrate, and zinc nitrate; acetate salts such as barium acetate, calcium acetate, and zinc acetate; and sulfate salts such as calcium sulfate, magnesium sulfate, and aluminum sulfate, and as a specific example, may be calcium chloride or calcium nitrate.

In addition, step (S200) may be a step of immersing the dip mold to which the coagulant is adhered in the latex composition for dip molding according to the present invention for forming the dip molding layer, and taking out the dip mold and forming the dip molding layer in the dip mold.

In addition, step (S300) may be a step of heating the dip molding layer formed in the dip mold for forming the dip molded article, thereby crosslinking the latex composition for dip molding to allow the curing to proceed.

Thereafter, the dip molding layer which is crosslinked by a heating treatment may be stripped from the dip mold to obtain the dip-molded article.

According to an exemplary embodiment of the present invention, the molded article may be gloves such as surgical gloves, examination gloves, industrial gloves, and household gloves, condoms, catheters, or health care products.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLE

Example 1

<Preparation of Carboxylic Acid-Modified Nitrile-Based Copolymer Latex>

100 parts by weight of a monomer mixture including 28 wt % of acrylonitrile, 63.0 wt % of 1,3-butadiene, and 5.5 wt % of methacrylic acid, 0.5 parts by weight of t-dodecyl mercaptan, 3.0 parts by weight of sodium alkyl benzene sulfonate, and 140 parts by weight of water were added to a polymerization reactor, and polymerization was initiated at a temperature of 40° C. Then, the polymerization was allowed to proceed by raising the temperature to 60° C. at a point of a polymerization conversion rate of 65%, and 0.1 parts by weight of sodium dimethyldithiocarbamate was added at a point of a polymerization conversion rate of 94% to stop the polymerization. Then, a certain amount of unreacted monomer was removed by deodorization process, and 0.5 parts by weight of ammonia water, 0.5 parts by weight of potassium hydroxide, 0.5 parts by weight of an antioxidant, and 0.3 parts by weight of a defoaming agent were added, thereby obtaining a carboxylic acid-modified nitrile-based copolymer latex at pH 8.0 having a solid concentration of 45 wt %.

<Preparation of Latex Composition for Dip Molding>

1 part by weight (based on solid content) of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to a solid content concentration of 10%, 1 part by weight of sulfur, 0.7 parts by weight of zinc dibutyldithiocarbamate (ZDBC), 1.5 parts by weight of zinc oxide, 1.0 part by weight of titanium oxide, 2.0 parts by weight of a potassium hydroxide solution, and secondary distilled water were added to the carboxylic acid-modified nitrile-based copolymer latex obtained above, thereby obtaining a latex composition for dip molding at pH 10 having a solid content concentration of 16 wt %.

<Manufacture of Dip-Molded Article>

18 wt % of calcium nitrate, 81.5 wt % of water, and 0.5 wt % of a wetting agent (Teric 320, Huntsman Corporation, Australia) were mixed to prepare a coagulant solution. A hand-shaped ceramic mold was soaked in the coagulant solution prepared above for 10 seconds, taken out, and dried at 80° C. for 3 minutes to coat the hand-shaped mold with the coagulant.

Thereafter, the mold coated with the coagulant was soaked in the latex composition for dip molding obtained above for 1 minute, taken out, and dried at 80° C. for 3 minutes. Then, the mold was soaked in water for 3 minutes for leaching, dried at 70° C. for 3 minutes, and crosslinked at 125° C. for 20 minutes. The crosslinked dip-molded article was stripped from the hand-shaped mold to obtain a glove-shaped dip-molded article.

Example 2

The process was carried out in the same manner as in Example 1, except that in the preparation of the latex composition for dip molding, 0.05 parts by weight, instead of 1 part by weight, of the hydrophobically modified alkali-soluble emulsion thickener was added.

Example 3

The process was carried out in the same manner as in Example 1, except that in the preparation of the latex composition for dip molding, 5 parts by weight, instead of 1 part by weight, of the hydrophobically modified alkali-soluble emulsion thickener was added.

Example 4

The process was carried out in the same manner as in Example 1, except that in the preparation of the latex composition for dip molding, 0.001 parts by weight, instead of 1 part by weight, of the hydrophobically modified alkali-soluble emulsion thickener was added.

Example 5

The process was carried out in the same manner as in Example 1, except that in the preparation of the latex composition for dip molding, 12 parts by weight, instead of 1 part by weight, of the hydrophobically modified alkali-soluble emulsion thickener was added.

Example 6

The process was carried out in the same manner as in Example 1, except that in the preparation of the latex composition for dip molding, 1 part by weight of a hydrophobically modified alkali-soluble emulsion thickener having a C12-C14 hydrophobic alkyl group (ACRYSOL™ DR-6600 (solid content concentration of 30%), Dow Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to a solid content concentration of 10%.

Example 7

The process was carried out in the same manner as in Example 1, except that in the preparation of the latex composition for dip molding, 1 part by weight of a hydrophobically modified alkali-soluble emulsion thickener having a C12-C14 hydrophobic alkyl group (ACRYSOL™ DR-5500 (solid content concentration of 30%), Dow Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to a solid content concentration of 10%.

Example 8

The process was carried out in the same manner as in Example 1, except that in the preparation of the latex composition for dip molding, 1 part by weight of a hydrophobically modified alkali-soluble emulsion thickener having hydrophobic alkyl groups in which a C12-C14 hydrophobic alkyl group and C16-C18 hydrophobic alkyl group are mixed at a weight ratio of 1:3 (ACRYSOL™ TT-935 (solid content concentration of 30%), Dow Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to a solid content concentration of 10%.

Comparative Example 1

The process was carried out in the same manner as in Example 1, except that in the preparation of the latex composition for dip molding, the hydrophobically modified alkali-soluble emulsion thickener was not added.

Comparative Example 2

The process was carried out in the same manner as in Example 1, except that in the preparation of the latex composition for dip molding, 1 part by weight of a hydrophobically modified alkali-soluble emulsion thickener having a C16-C18 hydrophobic alkyl group (ACRYSOL™ DR-72 (solid content concentration of 30%), Dow Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%)) diluted with secondary distilled water to 10%.

Comparative Example 3

The process was carried out in the same manner as in Example 1, except that in the preparation of the latex composition for dip molding, 1 part by weight of a hydrophobically modified alkali-soluble emulsion thickener having a C16-C18 hydrophobic alkyl group (ACRYSOL™

TT-615 (solid content concentration of 30%), Dow Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to 10%.

Comparative Example 4

The process was carried out in the same manner as in Example 1, except that in the preparation of the latex composition for dip molding, 1 part by weight of an alkali-soluble emulsion thickener (Sterocoll® FD, BASF Chemical Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%)) diluted with secondary distilled water to 10%.

Comparative Example 5

The process was carried out in the same manner as in Example 1, except that in the preparation of the latex composition for dip molding, 1 part by weight of an ethoxylated urethane thickener (ADEKANOL UH-526, ADEKA Company) diluted with secondary distilled water to 10% was added, instead of 1 part by weight of a hydrophobically modified alkali-soluble emulsion thickener having a C12-C14 hydrophobic alkyl group (ACRYSOL™ RM-7 (solid content concentration of 30%), Dow Chemical Company) diluted with secondary distilled water to 10%.

4466), a point when the specimen was cut was measured, and the elongation was calculated according to the following Equation 2:

$$\text{Elongation (\%)} = (\text{length after specimen elongation}/\text{initial length of specimen}) \times 100 \quad [\text{Equation 2}]$$

Flow marks: a mold coated with a coagulant was soaked in a composition for dip molding prepared in Examples and Comparative Examples for 1 minute, the mold was drawn up to a specific length and then soaked in the composition for dip molding, and the presence and the degree of flow marks were visually confirmed. The degree of produced flow marks was represented by classification of points. The more flow marks mean that the point is closer to 1, and the fewer flow marks mean that the point is closer to 10.

<Evaluation Criteria>

1 point: 10 or more per a round ceramic mold having a diameter of 4.3 cm and a height of 25.5 cm 3 points: 7 or more per a round ceramic mold having a diameter of 4.3 cm and a height of 25.5 cm 5 points: 5 or more per a round ceramic mold having a diameter of 4.3 cm and a height of 25.5 cm 7 points: 3 or more per a round ceramic mold having a diameter of 4.3 cm and a height of 25.5 cm 10 points: Less than 1 per a round ceramic mold having a diameter of 4.3 cm and a height of 25.5 cm Syneresis: In order to confirm a syneresis time, a mold coated with a coagulant was soaked in the composition for dip molding and then drawn up, and a time when water droplets fell during drying at a temperature of 120° C. for 4 minutes, was confirmed. The increased syneresis time represents better syneresis properties.

TABLE 1

| Classification | Example | | | | | | | | Comparative Example | | | | |
| --- | --- | --- | --- | --- | --- | --- | --- | --- | --- | --- | --- | --- | --- |
| | 1 | 2 | 3 | 4 | 5 | 6 | 7 | 8 | 1 | 2 | 3 | 4 | 5 |
| Tensile strength (MPa) | 31.6 | 30.5 | 32.6 | 30.4 | 30.45 | 31.8 | 32.3 | 31.6 | 30.4 | 29.8 | 25.1 | 26.4 | 29.8 |
| Elongation (%) | 655.4 | 648.4 | 645.6 | 624.1 | 641.0 | 653.2 | 656 | 655.4 | 640.6 | 620.6 | 619.2 | 58. | 590.1 |
| Flow marks (10 point method) | 7 | 5 | 4 | 3 | 3 | 8 | 7 | 7 | 3 | 2 | 1 | 1 | 4 |
| Syneresis (sec) | 365 | 360 | 350 | 102 | 98 | 355 | 345 | 360 | 51 | 340 | 320 | 300 | 50 |

Experimental Example

For comparison of each of the dip-molded articles manufactured in Examples 1 to 8 and Comparative Examples 1 to 5, tensile strength, elongation, flow marks, and syneresis were measured and are shown in the following Table 1.

Tensile strength (Mpa): in accordance with a method of ASTM D638, a crosshead speed was raised to 500 mm/min using a measuring instrument U.T.M (Instron, model 4466), a point when the specimen was cut was measured, and the tensile strength was calculated according to the following Equation 1:

$$\text{Tensile strength (Mpa)} = (\text{load value (kgf)})/(\text{thickness (mm)} \times \text{width (mm)}) \quad [\text{Equation 1}]$$

Elongation (%): in accordance with a method of ASTM D638, a crosshead speed was raised to 500 mm/min using a measuring instrument U.T.M (Instron, model As seen from Table 1, in the Examples in which a dip-molded article was manufactured using a latex composition for dip molding including a hydrophobically modified alkali-soluble emulsion thickener, it was confirmed that tensile strength was equivalent or higher, and flow mark properties and syneresis properties were excellent so that workability was also excellent, as compared with Comparative Example 1 in which a dip-molded article was manufactured using a latex composition for dip molding including no hydrophobically modified alkali-soluble emulsion thickener and Comparative Examples 2 and 3 in which the hydrophobically modified alkali-soluble emulsion thickener was included, but which included a hydrophobic group having 16 or more carbon. In addition, in Comparative Example 4 in which an alkali-soluble emulsion thickener including no hydrophobic group was included, it was confirmed that tensile properties and flow marks were decreased. In addition, in Comparative Example 5 in which a hydrophobically modified ethoxylated urethane thickener which is a kind of nonionic associative thickener was included, it was confirmed that tensile properties and syneresis were decreased.

The invention claimed is:

1. A latex composition for dip molding, comprising:
a carboxylic acid-modified nitrile-based copolymer latex, and
a hydrophobically modified alkali-soluble emulsion thickener, wherein
the hydrophobically modified alkali-soluble emulsion thickener includes a copolymer including an associative portion and a non-associative portion, and
the associative portion includes a monomer-derived repeating unit substituted by one or more first hydrophobic groups selected from the group consisting of alkyl, alkenyl, perfluoroalkyl, and carbosilyl having 8 to 15 carbon atoms, and aryl, arylalkyl, arylalkenyl, alicyclic alkyl, and polycyclic alkyl having 6 to 15 carbon atoms.

2. The latex composition for dip molding of claim 1, wherein the associative portion includes a monomer-derived repeating unit substituted by one or more hydrophobic groups selected from the group consisting of alkyl, alkenyl, perfluoroalkyl, and carbosilyl having 12 to 14 carbon atoms, and aryl, arylalkyl, arylalkenyl, alicyclic alkyl, and polycyclic alkyl having 10 to 15 carbon atoms.

3. The latex composition for dip molding of claim 1, wherein the first hydrophobic group is substituted by alkoxylate of 1 to 100 repeating units.

4. The latex composition for dip molding of claim 1, wherein the associative portion further comprises a monomer-derived repeating unit substituted by one or more second hydrophobic groups selected from the group consisting of alkyl, alkenyl, perfluoroalkyl, and carbosilyl having 16 to 30 carbon atoms, and aryl, arylalkyl, arylalkenyl, alicyclic alkyl, and polycyclic alkyl having 16 to 30 carbon atoms.

5. The latex composition for dip molding of claim 4, wherein the associative portion includes the monomer-derived repeating unit substituted by a first hydrophobic group and the monomer-derived repeating unit substituted by a second hydrophobic group at a weight ratio of 1:1 to 10.

6. The latex composition for dip molding of claim 1, wherein the non-associative portion includes an ethylenic unsaturated acid monomer-derived repeating unit and an alkyl (meth)acrylate monomer-derived repeating unit.

7. The latex composition for dip molding of claim 1, wherein the carboxylic acid-modified nitrile-based copolymer latex includes a carboxylic acid-modified nitrile-based copolymer including a conjugated diene-based monomer-derived repeating unit, an ethylenic unsaturated nitrile-based monomer-derived repeating unit, and an ethylenic unsaturated acid monomer-derived repeating unit.

8. The latex composition for dip molding of claim 1, wherein a content of the hydrophobically modified alkali-soluble emulsion thickener is 0.01 parts by weight to 10 parts by weight relative to 100 parts by weight of the carboxylic acid-modified nitrile-based copolymer latex based on a solid content.

9. A method of preparing a latex composition for dip molding, the method comprising:
preparing a carboxylic acid-modified nitrile-based copolymer latex; and
adding a hydrophobically modified alkali-soluble emulsion thickener to the carboxylic acid-modified nitrile-based copolymer latex, wherein
the hydrophobically modified alkali-soluble emulsion thickener includes a copolymer including an associative portion and a non-associative portion, and
the associative portion includes a monomer-derived repeating unit substituted by one or more hydrophobic groups selected from the group consisting of alkyl, alkenyl, perfluoroalkyl, and carbosilyl having 8 to 15 carbon atoms, and aryl, arylalkyl, arylalkenyl, alicyclic alkyl, and polycyclic alkyl having 6 to 15 carbon atoms.

10. A molded article comprising a layer derived from the latex composition for dip molding of claim 1.

11. The latex composition for dip molding of claim 1, wherein the associate portion is included in a content of 10 wt % to 25% based on a total content of the hydrophobically modified alkali-soluble emulsion thickener.

12. The latex composition for dip molding of claim 6, wherein the ethylenic unsaturated acid monomer-derived repeating unit is included in a content of 30 wt % to 60 wt % based on a total content of the hydrophobically modified alkali-soluble emulsion thickener.

13. The latex composition for dip molding of claim 1, wherein
the hydrophobically modified alkali-soluble emulsion thickener including the associative portion and the non-associative portion is a copolymer represented by the following Chemical Formula 1:

$$Q_1\text{-}[A]_x\text{-}[B]_y\text{-}[C]_z\text{-}Q_2 \qquad \text{[Chemical Formula 1]}$$

wherein
A is an ethylenic unsaturated acid monomer-derived repeating unit,
B is an alkyl (meth)acrylate monomer-derived repeating unit,
C is a monomer-derived repeating unit substituted by a first hydrophobic group or a monomer-derived repeating unit substituted by a first hydrophobic group and a monomer-derived repeating unit substituted by a second hydrophobic group,
$Q_1$ and $Q_2$ are independently of each other hydrogen or a monovalent hydrocarbon group having 1 to 30 carbon atoms, and
x, y, and z represent weight fractions of A, B, and C in the hydrophobically modified alkali-soluble emulsion thickener and x+y+z=1.

* * * * *